United States Patent [19]

Koenck et al.

[11] Patent Number: 5,313,053
[45] Date of Patent: May 17, 1994

[54] LASER SCANNER MODULE HAVING INTEGRAL INTERFACING WITH HAND-HELD DATA CAPTURE TERMINAL

[75] Inventors: Steven E. Koenck; Phillip Miller; George E. Hanson; Darald R. Schultz; Jeffrey S. Krunnfusz, all of Cedar Rapids, Iowa

[73] Assignee: Norand Corporation, Cedar Rapids, Iowa

[21] Appl. No.: 987,574

[22] Filed: Dec. 8, 1992

Related U.S. Application Data

[63] Continuation of Ser. No. 674,756, Mar. 25, 1991, abandoned, which is a continuation-in-part of Ser. No. 467,096, Jan. 18, 1990, Pat. No. 5,052,020, and a continuation-in-part of Ser. No. 660,615, Feb. 25, 1991, Pat. No. 5,218,187.

[51] Int. Cl.$^5$ .............................................. G06K 7/10
[52] U.S. Cl. .................................. 235/472; 235/467; 235/470
[58] Field of Search .......................... 235/467, 470, 472

[56] References Cited

U.S. PATENT DOCUMENTS

| | | |
|---|---|---|
| 3,976,973 | 8/1976 | Martin et al. . |
| 4,207,527 | 6/1980 | Abt . |
| 4,385,285 | 5/1983 | Horst et al. . |
| 4,418,277 | 11/1983 | Tremmel et al. . |
| 4,540,897 | 9/1985 | Takaoka et al. . |
| 4,556,983 | 12/1985 | Heitmann et al. . |
| 4,560,862 | 12/1985 | Eastman et al. . |
| 4,569,421 | 2/1986 | Sandstedt . |
| 4,584,690 | 4/1986 | Cafiero et al. . |
| 4,628,193 | 12/1986 | Blum . |
| 4,641,292 | 2/1987 | Tunnell et al. . |
| 4,727,245 | 2/1988 | Dobbins et al. . |
| 4,749,353 | 6/1988 | Breedlove . |
| 4,785,717 | 11/1988 | Rocholl et al. . |
| 4,831,275 | 5/1989 | Drucker . |
| 4,841,129 | 6/1989 | Tawara et al. . |
| 4,850,009 | 7/1989 | Zook et al. . |
| 4,857,716 | 8/1989 | Gombrich et al. . |
| 4,877,949 | 10/1989 | Danielson et al. . |
| 4,882,476 | 11/1989 | White . |
| 4,897,532 | 1/1990 | Swartz et al. . |
| 4,897,857 | 1/1990 | Wakatsuki et al. . |
| 4,902,883 | 2/1990 | Poland . |
| 4,910,753 | 3/1990 | Wakatsuki et al. . |
| 4,984,881 | 1/1991 | Osada et al. . |
| 5,052,020 | 9/1991 | Koenck et al. . |
| 5,055,660 | 10/1991 | Bertagna et al. . |
| 5,107,100 | 4/1992 | Shepard et al. . |

*Primary Examiner*—Harold Pitts
*Attorney, Agent, or Firm*—McAndrews, Held & Malloy, Ltd.

[57] ABSTRACT

A portable, hand-held data terminal of modular structure includes a base module with a keyboard and a display screen. A data collection and communications module includes a stacked arrangement of a communications interface main circuit board, a radio and a laser scanner assembly which are housed in a housing shell which is attachable to the base module. The radio is mounted in spaced relationship to one side of the main circuit board, while the laser scanner assembly is mounted to the other side of the main circuit board. A support frame and a plurality of ground planes in the sandwiched main circuit board and a routing circuit board form an RF cage for shielding RF interference which may be generated by the radio.

11 Claims, 5 Drawing Sheets

LASER SCANNER MODULE HAVING INTEGRAL INTERFACING WITH HAND-HELD DATA CAPTURE TERMINAL

CROSS REFERENCE TO RELATED APPLICATIONS (Claiming Benefit Under 35 U.S.C. 120)

This application is a continuation application of U.S. Ser. No. 07/674,756, filed Mar. 25, 1991, now abandoned, which, in turn, is a continuation-in-part application of PCT application PCT/US90/03282, filed Jun. 7, 1990, U.S. application Ser. No. 07/467,096, filed Jan. 18, 1990, by S. E. Koenck and R. L. Mahany, now U.S. Pat. No. 5,052,020 filed Apr. 24, 1991, and U.S. application Ser. No. 07/660,615, filed Feb. 25, 1991, by S. E. Koenck et al now U.S. Pat. No. 5,218,187 filed Jun. 8, 1993.

BACKGROUND OF THE INVENTION

This invention relates generally to data collection and processing systems using portable, hand-held data terminals for collecting data, and for selectively processing and communicating collected data to other system elements. More particularly, the invention relates to collection apparatus of such hand-held data terminals. Typical collection processes may include reading data and manually keying in such read data. The present invention relates particularly to apparatus for reading data into the terminal. Known automated reading processes are executed by apparatus which includes scanning readers, for example.

In efforts to adapt data collection terminals to a wider scope of uses, terminals with increased ruggedness over state of the art terminals are bringing advances to the art. However, the usefulness of the data collection terminals may also be increased by further reducing the weight and size of the data collection terminals to sizes and weights below the present lower limits of state of the art terminals. Typically a reduction in size might result in the elimination of at least some desirable features. The use of modular data collection terminals would support the reduction in non-essential features to achieve certain reduction in size and weight.

SUMMARY OF THE INVENTION

The PCT application Ser. No. 90/0382, filed Jun. 7, 1990, assigned to and owned by the assignee of the present application, refers to such a modular hand-held unit and discloses a manner of attaching one functional module to another. The use of functional modules increases the scope of use of the basic data collection terminals by allowing the substitution of a most desirable feature in a particular application for another feature which may have become redundant. The eliminated feature may be least likely to be used in conjunction with the newly added feature. Without increase in size and weight of one type data collection terminal over another, respective functions may be adapted to specific situations. In certain applications, however, selected modules desirably include added features. The addition of such features in accordance with the invention is advantageously accomplished with a minimal size and weight change.

Hence, as contemplated, a laser scanner is added to a data collection terminal unit which typically features a radio frequency transceiver module. In accordance with particular features of the invention, a radio transceiver and a laser scanner are integrated into a single module with only a minimal increase in volume over the volume of a radio transceiver module without the laser scanner unit.

According to another aspect of the invention, rotatably mounted scanning mirrors of a laser scanner are formed about magnetic poles of an armature of a motor for rotating the mirrors.

In accordance with another feature of the invention, electronic elements and physical elements for implementing functions of a laser scanner of the hand-held data collection terminal and electronic coupling circuits for interconnecting the laser scanner with the data collection terminal are disposed in interleaved relationship with electronic components for processing communications between a transceiver and the laser scanner.

Various other features and advantages of the data terminal in accordance with the invention will become apparent from the following detailed description, which may be best understood when read with reference to the appended drawings.

DETAILED DESCRIPTION OF THE INVENTION

Figure 1:
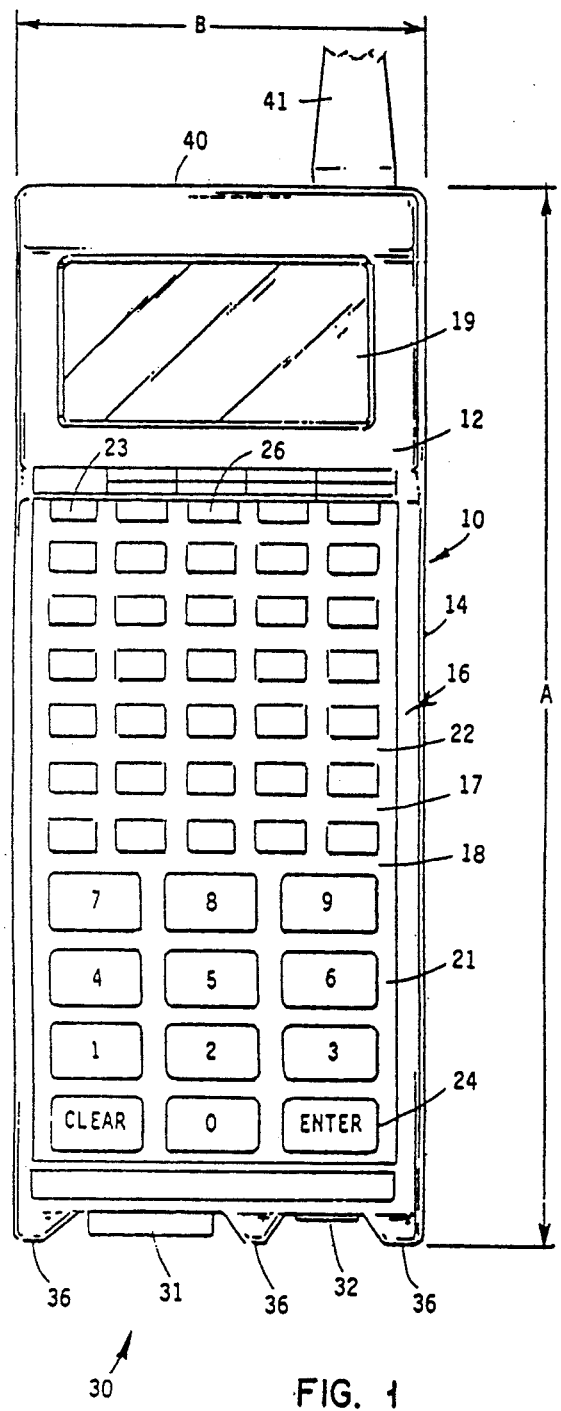
FIG. 1 shows a frontal view of a modular data terminal.
Figure 2:
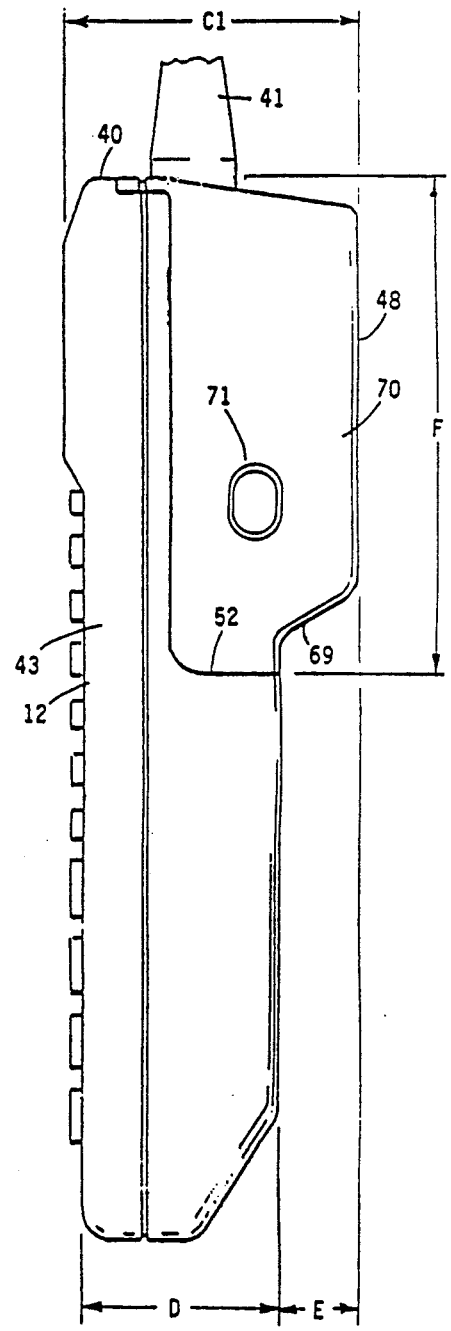
FIG. 2 is a side view of the data terminal shown in FIG. 1.

Referring now to FIGS. 1 and 2, a data collection terminal unit, also referred to herein as data terminal, is designated generally by the numeral 10. As shown in FIG. 1, a frontal face 12 of an elongate housing 14 of a base module 16 of the data terminal 10 typical faces upward and is accessible to the user of the data terminal. The upward facing portion of the module 16 houses a keyboard module 17, including an alphanumerical keyboard 18 and a display screen 19. The display screen 19 is in a preferred embodiment described herein a 4-line by 16-character Reflective Super Twist Liquid Crystal Display (LCD). Of course, other display means may be used in its stead. The keyboard 18 includes a lower, standard numerical keyboard section 21, above which is disposed an alphabetical keyboard arrangement 22. An On-Off power key 23 is preferably placed in a leftmost position of an uppermost row on an uppermost row of five keys. The outermost keys 24 in a bottom row are configured as "CLEAR" and "ENTER", while the remaining four keys in the uppermost row are preferably configured as a set of four user-defined function keys 26.

At a bottom end 30 of the housing 14, there are located two connector plugs 31 and 32. The connectors 31 and 32 are protected by adjacent end and interleaved protrusions 36 of the housing 14, which protrusions extend somewhat past the connectors. A preferred embodiment of the data terminal 10 is intended to withstand without damage a drop of about 1.2 meters to a solid surface, such as concrete. The Preferred connector 31 is an input-output port, as may be used for such data collection as bar code reading, for example. In such instance, the connector 31 is Preferred to be a 9-pin D-subminiature connector with pins interfacing to typical 5 volt scanning peripherals. The connector 32 may be used for accessing external power sources or provide of combined power and data communication. A circular miniature DIN-type connector 32 may be used in the preferred embodiment. A top end 40 of the preferred embodiment of the base module 16 typically may not include connectors. An antenna 41 shown to extend above the top end 40 is further described in reference to FIG. 2. The described frontal, substantially rectangular configuration of the data collection terminal 10 has a length of substantially seven inches (Dimension A=7 inches) and a width of approximately two and three quarter inches (Dimension B=2¾"). The size is convenient to hold the terminal in one's hand, and, as seen from FIG. 2, the thickness or depth of the data terminal 10 permits the terminal 10 to be carried about in a potential user's pocket.

FIG. 2 shows depth or thickness features of the data terminal 10. The base module 16 of the data terminal 10 with the described frontal face 12 includes an elongate upper housing portion 43 which defines the longitudinal and lateral extent of the data terminal 10. Attached to the upper housing portion 43 and disposed adjacent the bottom end 30 is a lower battery compartment 44. In the preferred embodiment, the battery compartment 44 is assembled as a lower housing portion to the upper housing portion 43. Adjacent the top end 40 of the data terminal 10 a data collection and communications module 48 is attached to the lower edge of the upper housing portion 43. The antenna 41 as is typical for external antennas extends upward from the data collection and communications module 48 above the top end 40 of the data terminal 10.

One of the features of hand-held data terminals related to this invention and as disclosed in the PCT application PCT/US90/03282 relates to the exchangeability of modules of different shape and varied function. It is of course desirable to have the various modules, though of different shape, substantially of the same size, such that the feel and handling of the family of data terminals 10 remain substantially identical regardless by what features a particular module may be distinguished over another data terminal 10. The data collection and communications module 48 in FIG. 2 includes a radio 49 and a laser scanning apparatus 50, the relative positions of which are best referred to in FIG. 5. Externally the presence of the radio module 49 is of course indicated by the presence of the antenna 41 in FIG. 2. The radio module may be a commercially available pretuned 1-watt (UHF) frequency modulated (FM) radio transceiver module, or any similar radio module, such as a Motorola P10 ™ radio model, for example.

Figure 3:
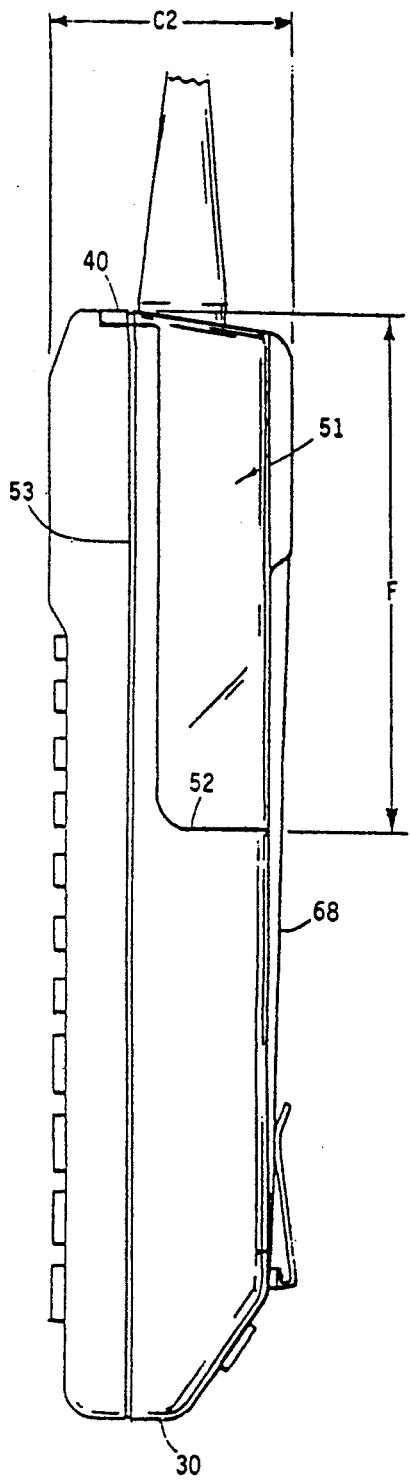
FIG. 3 is a side view of a related data collection terminal having a communications module without a laser scanner.
Figure 4:
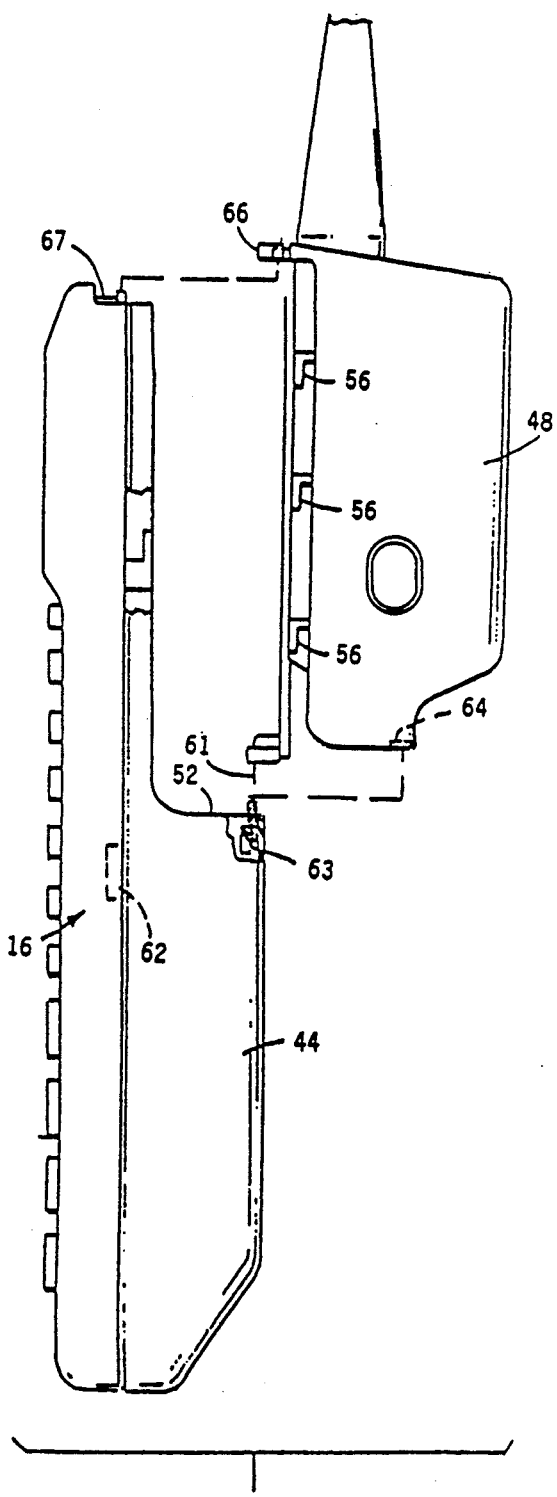
FIG. 4 is a side view of the data terminal shown in FIG. 1, showing somewhat schematically a data collection and communications module.

In accordance herewith it is contemplated to provide the data collection and communications module 48 as a module which is capable of readily replacing another module, such as a radio communications module 51 which is shown in FIG. 3, for example, and which does not include a combined radio and laser scanning function. Each of these interchangeable modules feature a quick exchange mounting mechanism, such as is more clearly illustrated with respect to FIG. 4. As shown in FIG. 4, the data collection and communications module 48 is matched in a contour continuation along a juncture line 52 to the housing 14 adjacent edge of the battery compartment 44 and along a longitudinal parting line 53 of the base module 16. The juncture line 52 defines a cavity within the base module 16 within which modules as the module 48 may be received. The module 48 features a plurality of laterally disposed latching hooks or latch hooks 56 which become engaged by respective latching seats or latch seats 57 disposed along the adjacent edge of the base module 16 when the module 48 is moved toward and into engagement with the adjacent edge and then toward the battery compartment 44, as shown by the arrow. Electrical communication is established via a power and communications connector 61 the pins of which engage a mating connector socket 62 within the base module 16. A set of screws 63 may be tightened through the battery compartment 44 into a set of threaded seats 64 disposed in the adjacent wall of the module 48 to securely retain the attached module as an integrated part of the data terminal 10. At the top end of the data terminal 10, a lip or extending stop edge 66 of the module 55 engages a complementarily shaped seat 67 to securely interlock the data collection and communications module 48 with the base module 16.

FIGS. 2 and 3 depict a comparison of relative depths or thicknesses between the data collection and communications module 48 and the radio communications module 51. The radio communications module 51 is also shown equipped with a preferred hand strap 68 attached longitudinally to the rear of the data terminal 10. Though not presently contemplated for use on the data terminal 10 featuring the data collection and communications module 48, it is clearly possible to use the hand strap 68 on the data terminal 10 having the module 48. As seen in FIG. 3, the radio communications module 51 fits generally with its thickness into the contour of the housing of the data terminal 10. The additional laser scanning apparatus 50 does require an increased thickness or depth in the general contour of the housing 14. However, in accordance herewith, an increase in the thickness of the housing 14 has been minimized, as will become apparent from the further description of the improved arrangement of the laser scanning apparatus 50, but a necessary increase in the depth has been employed to increase the ease of manually holding the data terminal 10 during use. Either of the modules 48 or 51, when seated against the rear of the housing 14, blends with the contour of the housing along the line 52. FIG. 2 shows a thickness of the data terminal 10 at its bottom end of only about 1½ inches (Dimension D), while the thickness at the top end 40 of the data terminal with the data collection and communications module 48 amounts to two inches (Dimension C1=2"). In FIG. 3, both top and bottom ends 40 and 30 of the data terminal 10 with the radio module 51 measure substantially the same depth or thickness of about 1½ inches (Dimension C2=1½). The increase in the thickness of the module 48 over that of the module 51 (Dimension E=½") is formed in a transition 69 which has been found to advantageously provide a resting ledge for the index finger of a user of the data terminal 10, providing added stability during use of the data terminal 10. With the index finger of the user resting against the transition or ledge 69, the thumb of the user is conveniently located along a lateral surface 70 of the module 48. A pushbutton 71 is disposed in the general area of the lateral surface 70 to be readily accessible for activation by the user's thumb. The pushbutton 71 is hence used to activate a laser scanning operation of the laser scanning apparatus 50. The pushbutton 71 may be duplicated in an identical location on the opposite lateral wall of the module 48. In this manner both left-handed and right-handed users of the data terminal 10 would be able to use the laser operation trigger pushbutton 71. The location of the pushbutton 71 in FIG. 2 denotes both oppositely facing pushbutton locations on the opposite side walls of the module 48. The overall lengths of the modules 48 and 51 are substantially identical (Dimension F=3¼") because of overall longitudinal restraints.

Figure 5:
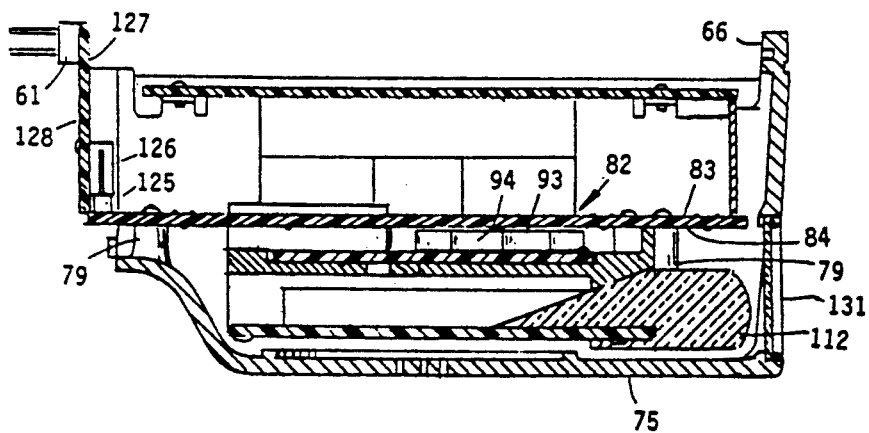
FIG. 5 is a sectional view, showing somewhat simplified a stacked arrangement of a radio, a communications interface main circuit board and a laser scanner assembly.
Figure 6:
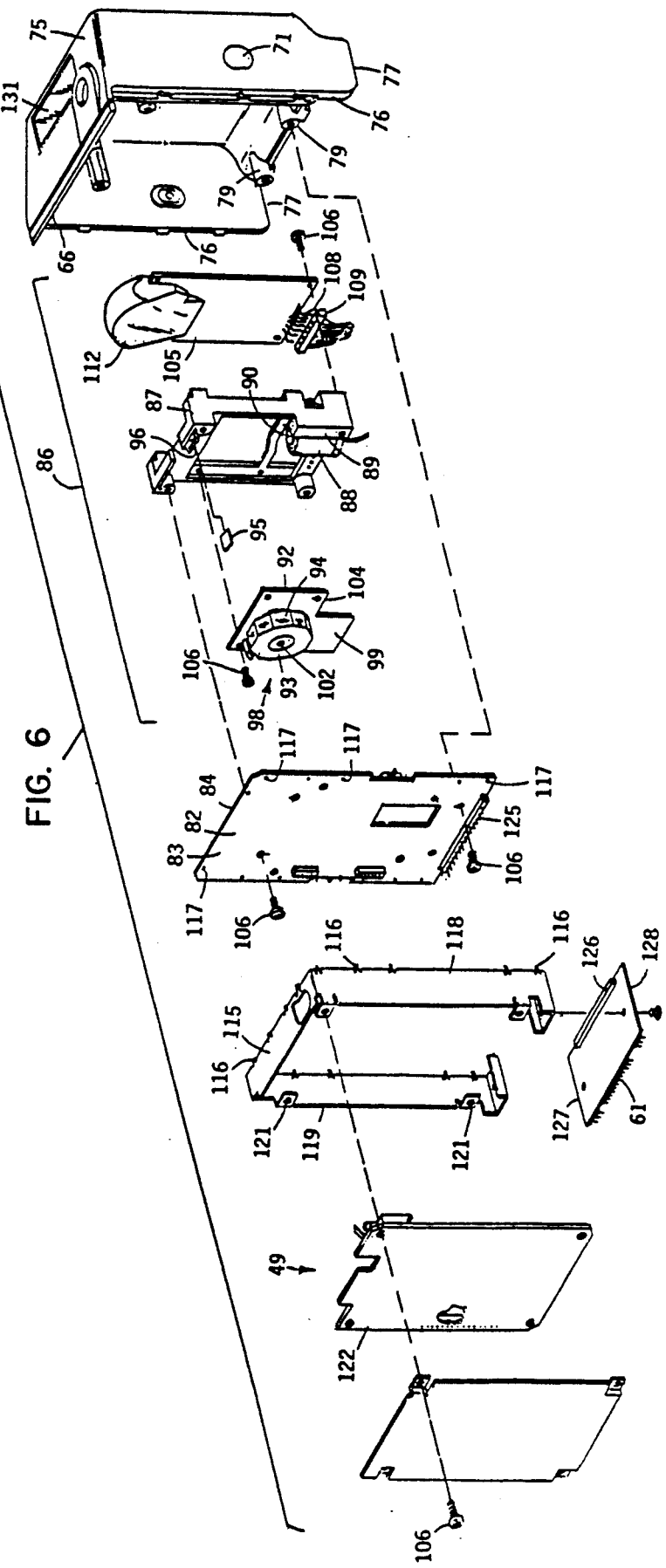
FIG. 6 is an exploded view of the data collection and communications module.

FIGS. 5 and 6 best illustrate the physical interrelationship between various elements of the radio 49 and the laser scanning apparatus 50 which results in the described minimal increase of the overall thickness of the data collection and communications module 48 over the radio module 51. The module 48 is contained within a molded protective shell 75 of a high impact plastic material, preferably identical to the material employed for the housing 14. The outer contour of the shell 75 also blends into that of the housing 14, such that when edges 76 and 77 and the stop edge 66 are placed and locked against the respectively matching juncture lines 52 and the seat 67, the protective shell forms part of the housing 14. The edges 76 include the latch hooks 56 which lock the shell 75 to the housing 14. An apertured boss, such as indicated at 78 provides a mounting seat for the antenna 41. Interiorly of the shell 75 a plurality of spaced, internally threaded bossed 79 are disposed in a plane to support the mounting of a main circuit board 82, which is also referred to as an analog board 92.

The analog board 92 is a multi use element, in that it is first of all a circuit board. The circuit board 92 is in particular a four-layer circuit board, having conductive patterns disposed on both major outer surfaces 83 and 84, the conductive patterns including designated sites form mounting electronic components to both sides of the circuit board. Two inner conductive planes provide ground and interconnection planes for the components on the respective outer surfaces of the circuit board 82. The ground plane within the circuit board 82 substantially isolates electrical radio noise from interfering with the laser scanning components and to minimize such radio noise from being emitted from the shell 75.

To the surface 84 of the main circuit board 82 there is mounted a laser scanner submodule 86. The laser scanner submodule 86 includes a mounting frame 87, preferably a molded structure of a high impact plastic. A laser diode 88 is mounted to a support seat 89 of the mounting frame 87. The laser diode is of cylindrical shape, approximately ½ of an inch in diameter and about ¾ of an inch long. The laser diode 88 is a known and commercially available element, such as under the designation TOLD 9211 from Toshiba Electric, for example. The laser diode is provided as a fully assembled unit including collimating optics having a lens window 90 through which a collimated laser beam is emitted. The preferred laser diode 88 is of "InGaAlp" material, a known laser material which emits light in the humanly perceivable wavelength range of 670 nanometers. The emitted light is perceived as ruby red, giving the operator of the laser scanner an indication of the operability of the laser and permitting the laser light to be visually "aimed" against indicia such as a bar code to be read. A scanning mirror assembly 92 is placed adjacent the path of the emitted laser beam, such that in a plan view a regular polygon 93 of highly polished mirrors 94 is disposed in the plane of the laser beam emitted from the window 90. The mirrors 94 form a cylinder having a sectional shape of a regular polygon. In the preferred embodiment a total of ten mirrors 94 are evenly spaced about the periphery of the right cylinder. The laser beam impinges on a primary reflector mirror 95 which is typically held in a seat 96 of the frame 87. The scanning mirror assembly 92 is a circuit board mounted assembly of stepping motor assembly 98. The right cylinder appearing in plan view as a regular polygon 93 of the mirrors 94 constitutes an armature of the motor assembly 98. The mirrors 94 are formed in the peripheral wall of the armature of the motor assembly 98. A motor circuit board 99 supports a spindle 102 of the armature 93. The motor circuit board 99 also supports electronic driver components of the motor assembly 98. The scanning mirror assembly 92 is mounted to the frame 87. A cut-out 104 in the circuit board 99 provides clearance between the board 99 and the laser diode 88, such that the mirrors 94 are disposed in the emission plane of the laser diode 88.

An optical analog circuit board 105 is mounted against the frame 87 across from the main circuit board 82 and fastened with typical mounting screws 106 to the frame 87. A typical circuit board connector pin arrangement, such as is shown at 108 may be connected to a typical flat cable 109 to electrically couple the analog circuit board 105 to the main circuit board 82 and to the scanning mirror assembly 92. The circuit board 105 includes circuit elements for receiving and amplifying optical signals which represent reflected signals as a result of the outgoing laser beam from from the laser diode 88. The circuit elements include such typical elements as photo diodes which are integrated into receiving optics 112 mounted to the circuit board 105.

Mounted to the surface 83 of the main surface board 82 is a radio support frame 115. The radio support frame 115 is a U-shaped frame which is mounted peripherally about the circuit board 82 extending upward from its surface 83. Formed tongues 116 of the support frame 115 are insertible into apertures 117 of the circuit board 82 to fasten the frame 115 to the circuit board The frame 115 has a predetermined height between a lower edge 118 and an upper edge 119. Apertured mounting lugs 121 disposed at the upper edge 119 are adapted to receive the threaded fasteners 106. The radio 49 is mounted on a circuit board 122. The circuit board 122 is attached, such as by the fasteners 106, to the lugs 121 of the support frame 115, the height of the support frame 115 spacing the main circuit board 82 and the radio circuit board 122 to accommodate the components on both boards. The support frame in conjunction with the ground plane of the circuit board 82 also forms a radio frequency emission cage about the components of the radio circuit board 122, containing radio frequency (RF) emissions in accordance with regulations. The circuit board 122 may in itself contain RF shielding toward the top of the formed cage, or separate shielding such as an additional board having a ground plane may be added.

A circuit board connector pin arrangement 125 receives a typical circuit board connector strip 126 of a circuit routing board 127. The circuit routing board 127 routes power and communicative interconnections between the main circuit board 82 and the base module 16. A conductive ground plane 128 of the routing board 127 may preferably be coupled to the support frame 115 to complete the RF cage in conjunction with the support frame 115 and the ground plane of the main circuit board 82.

The assembly of the described elements of the main circuit board 82, the laser scanner assembly 86 and the radio 49 into the housing shell 75 spaces the elements tightly, placing the plane of the laser beam and the receiving optics 112 of the laser scanner analog circuit board 105 adjacent a scanning window 131 of the shell 75. The scanning laser beam and its reflection pass through the window in the outgoing and incoming directions, respectively. Spacing the described components at minimum distances adjacent one another as shown in the sectional view of FIG. 5, for example, is made possible by a cutout 132 in the main circuit board 82 to accommodate an upper portion of the laser diode 88. It has been found that the cutout 132 in the main circuit board 82 and hence in its ground plane does not adversely affect RF shielding of emissions from the radio 49. Further in reference to the main circuit board 82 as shown in FIG. 6, the circuit board 82 includes on opposite edges 136 and 137 electrical actuator switches 138. The switches 138 are the electrical components which in conjunction with the external element of the pushbutton 71, typically a molded rubber part, form the pushbutton 71. The external portion of the pushbutton 71 is disposed in the shell 75 to become aligned with the electrical actuator switches 138 when the main circuit board 82 is assembled into the shell 75 as shown in FIG. 5, for example.

Figure 7:
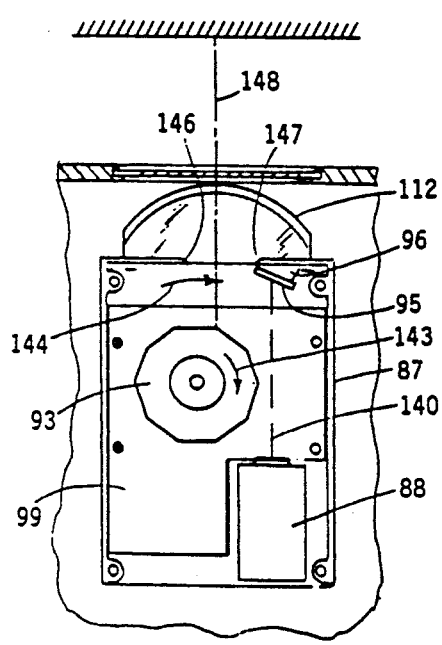
FIG. 7 is a partial plan view of the laser scanner assembly of FIG. 5.

FIG. 7 is a simplified top view of the laser scanner assembly 86 to show the path of the laser beam emitted from the laser diode 88, as shown at 140. The laser beam 140 impinges against the primary reflector mirror 95 and is reflected at 142 against the rotating polygon of preferably ten mirrors 94. The armature 93 rotates during the scanning process in the direction of arrow 143, such that the laser beam reflected from the mirrors 94 scans at 144 in a direction from left to right of an operator holding the data terminal 10. Left and right scanning window edges 146 and 147, respectively, cut off the laser beam to the far left and right and limit the scanning angle to a reasonable deflection from a centerline of the data terminal 10. The optimum scanning angle may be altered by relocating the window edges 146 and 147 accordingly. The laser beam, when reflected from an impinged on surface 149 into the receiving optics 112, would be modulated in accordance to reflection patterns on such reflected surface 149, such as the dark and light alternating regions of a bar code.

Figure 8:
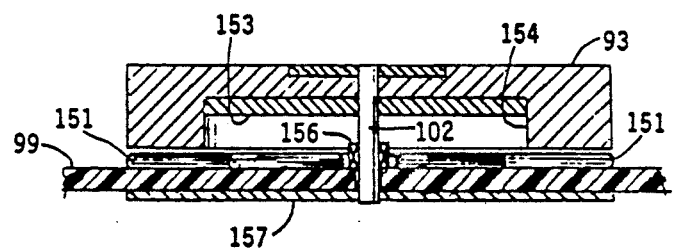
FIG. 8 is a somewhat simplified sectional view of a motor assembly of the laser scanner assembly shown in FIG. 7.

FIG. 8 is a cross sectional view through the stepping motor assembly 98 which is somewhat simplified for clarity sake. The motor circuit board 99 supports magnetic field coils 151, of which there may be three equally spaced coils, as in a preferred example. The coils 151 lie in the plane of the motor circuit board 99 and direct a magnetic field substantially perpendicularly thereto out of the plane of the circuit board 99. The coils 151 are electrically coupled to electronic driver elements (not shown) which are preferably also disposed adjacent the coils 151 on the motor circuit board 99. The main body of the armature 93 is of non magnetic material, such as aluminum. However, a magnetized permanent magnet element 153 is disposed in a central recess 154 of the armature 93. The armature 93 is rotatably supported by the spindle or shaft 102 which may be mounted for rotation in a bearing 156 disposed on the surface of the motor circuit board 99. Alternately, the spindle might be fixedly mounted to extend from the motor circuit board 99, such that the bearing 156 would reside between the spindle and the armature. A circular plate 157 of a magnetically conductive material is disposed below the circuit board 99 to serve as a magnetic flux shunt and provide a magnetic return path for the magnetic flux lines generated by the coils 151.

Figure 9:
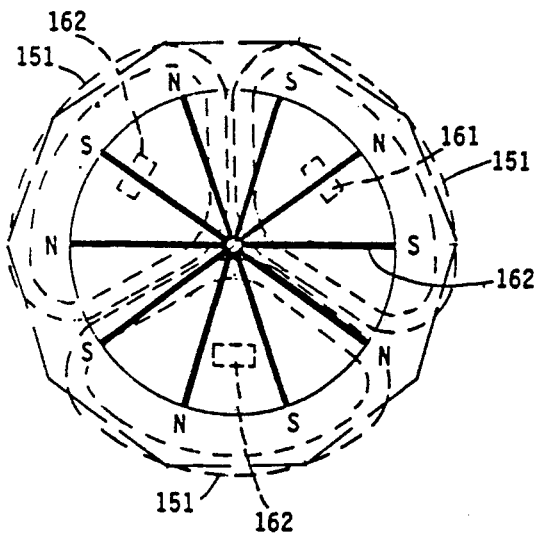
FIG. 9 is a schematic plan view diagram of the motor assembly shown in section in FIG. 8.

FIG. 9, showing a schematic plan view of the armature 93 and the field coils 151. The magnet element 153 of the armature 93 has a plurality of alternately oriented peripherally spaced magnetic polepieces 161 which are in a preferred embodiment part of the single ceramic type magnet disc 153. Within each of the coils 151, there may be located a hall effect sensor device 162. The hall effect sensors 162 detect from the magnetic field the current position of the armature or rotor 93 to control the switching of the drive current through the coils 151. In the stepping motor art there are various known ways of switching coils and of overdriving in accordance with the position of the rotor 93 to achieve a desirable drive pattern of the rotor. In the present embodiment of the invention, a substantially uniform scan rate is of course desirable though the armature or rotor 93 is driven through the stepping sequence of the motor assembly 98. It should be understood that the use of hall effect devices to determine the position of the armature 93 is but one known manner for controlling the speed of rotation and the position of the armature. It is also possible to use opto-electronic encoding techniques to achieve substantially similar position recognition and to control the speed of rotation of the armature 93. It is to be realized that the flattened structure of the motor assembly 98 resulting from the folding back of the mirrors 94 on the armature 93 is of significance in containing the radio 49 and the laser scanner 50 within the shell 75 of the preferred size as described herein.

Figure 10:
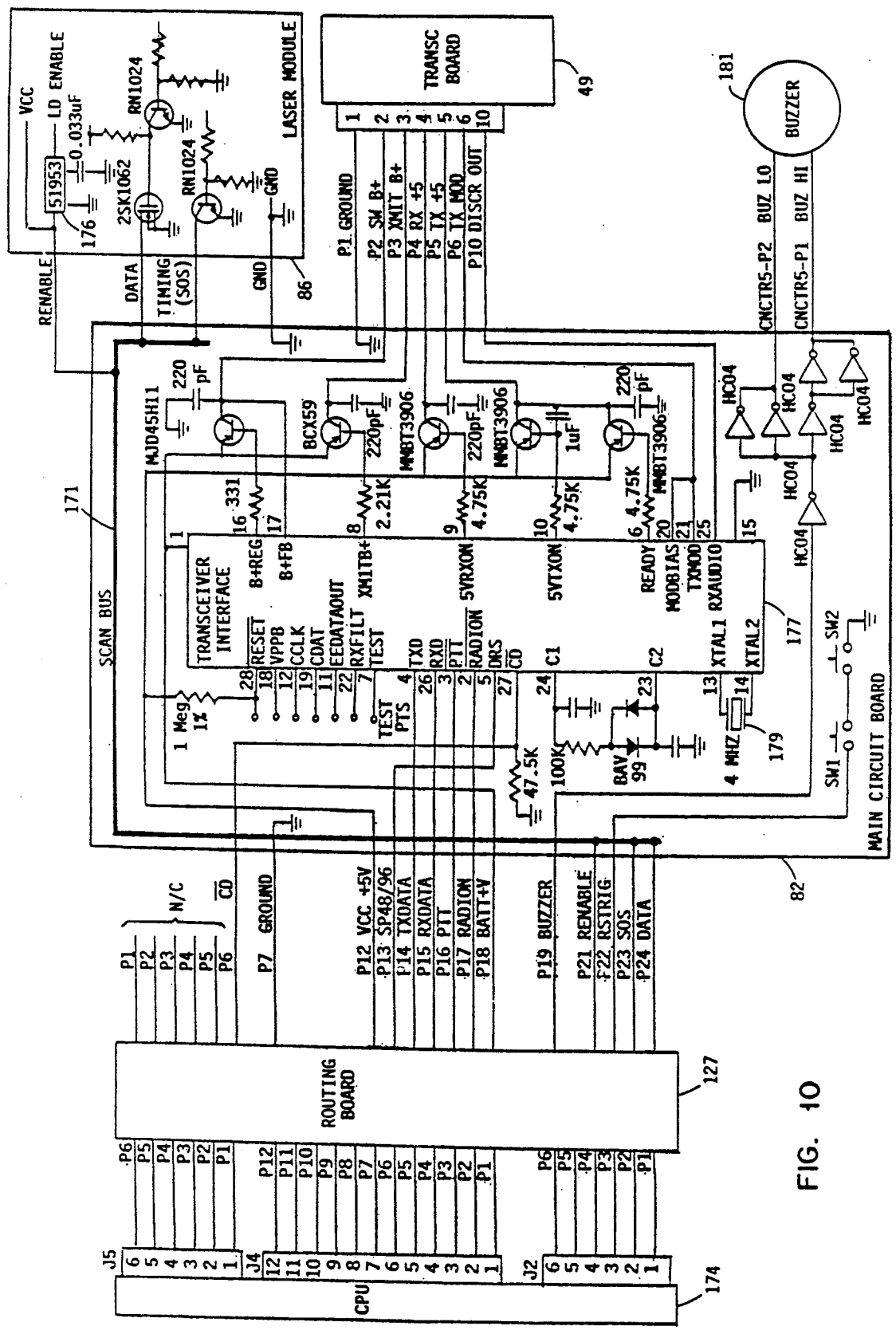
FIG. 10 is a functional schematic diagram showing the manner in which the various elements of the data collection and communications module interact with each other.

Reference to the schematic diagram in FIG. 10 shows major functional elements of the described data collection and communications module 49. The functional representation of the laser scanning assembly 86, referred to in FIG. 10 as laser module 86 is coupled with four connections to a scan bus 171 on the main circuit board 82. The electronic circuits in the laser module for driving the stepping motor and for amplifying reflected signals is a commercially available configuration. In the preferred embodiment, the circuits of the laser module 86 have been obtained from Optoelectronics Co. Ltd. in Japan. Connections for communicating signals between the laser module 86 and a microprocessor (CPU) 174 of the base module 16 include RENABLE, DATA, TIMING (SOS), and ground (GND). RENABLE activates the laser module 86 upon one of the pushbuttons 71 being closed, as represented by SW1 and SW2 on the main circuit board 82. Closing of either of the pushbuttons 71 is recognized by the CPU 174 of the base module 16. The CPU switches the RENABLE connection to a high, which powers up the laser scanner assembly 86. VCC is a typical power input, while the laser diode is driven through a DC to DC converter "51953", identified by numeral 176. When the motor 98 has come to speed the laser diode is turned on, and the laser module 86 sends a signal via TIMING (SOS) to the CPU 174. The TIMING signal frames the data and alerts the CPU that data are forthcoming. Data are transmitted to the CPU via the DATA line and the scan bus 171. It should be noted that the scan bus 171 is coupled via the routing board 127 to the CPU 174 of the base module 16, and all other signal and power lines are simply routed through the routing board 127 between the main circuit board 82 and the base module 16. There is no further manipulation of data or signals between the CPU and the laser module 86 on the main circuit board. On the other hand, the main circuit board 82 performs various functions relating to the control of radio communication between the CPU 174 and the radio or transceiver board 49. It should be noted that not all possible control leads to the radio 49 are connected to the CPU 174 or to the main circuit board 82, though it is conceivable that additional functions may be implemented and connected in variations of the preferred embodiment with respect to which the invention is described. Functions relating in particular to the control of the radio 49 and particularly to the frequency control in digital data transmission are discussed in related U.S. Pat. No. 5,052,020 filed Jan. 18, 1990, by S. E. Koenck and R. L. Mahany, assigned to the assignee of the present application, the disclosure of which in its entirety is incorporated herein by reference. Thus, as is apparent from FIG. 10, the TRANSCEIVER INTERFACE function represented by a circuit element 177 is a communications interface for between the radio 49 and the CPU 174. The circuit element 177 activates power to the radio 49 and controls transmission and reception signals, such as indicated by TX MOD and DISCR OUT. The circuit element 177 is driven by an on board clock timed by a 4MHZ crystal 179. A buzzer circuit 181 is amplified using on-board power of the main circuit board 82. It should be realized that not all connections from any commercially available radio 49 and the main circuit board may be used. Various types of radios are known, of which certain radios may function on more than one frequency or a radio type referred to as spread spectrum radio may require various controls. It is contemplated that such radios referred to as spread spectrum radios may be used in conjunction with and as part of the invention described herein. The descriptive matter of U.S. Pat. application Ser. No. 07/660,615, filed Feb. 25, 1991, by S. E. Koenck et al., the application being assigned to the assignee of the present application, is being incorporated herein by reference. Such patent application refers to advantages of adapting modules to function with different radios. It appears from the above disclosure herein that the present invention may be adapted to function with a number of such different types of radios.

Various other changes and modifications in the structure of the described embodiment are possible without departing from the spirit and scope of the invention as set forth in the claims.

What is claimed is:

1. A motor assembly for a laser scanning apparatus comprising:
   a printed circuit board;
   a cylinder formed from a non-magnetic material, said cylinder having a central cavity;
   a plurality of mirrors formed in a peripheral wall of said cylinder;
   a magnetic element disposed in said central cavity, said magnetic member having a plurality of alternately disposed magnetic fields;
   means for connecting said cylinder to said printed circuit board to allow rotation of said cylinder; and,
   a plurality of coils disposed on said printed circuit board for forming magnetic fields which cooperate with said magnetic fields of said magnetic element to rotate said cylinder.

2. A motor assembly as claimed in claim 1 wherein said means for connecting comprises:
   a shaft disposed in said central cavity, a first end of said shaft fixedly engaging said armature; and
   a bearing connected to said printed circuit board and engaging a second end of said shaft.

3. A motor assembly as claimed in claim 1 wherein said motor assembly further comprises a magnetically conductive plate disposed on a side of said printed circuit board opposite said plurality of coils, said plate serving as a magnetic flux shunt to return flux to said plurality of coils.

4. A data collection and communications module including means for mounting said module to a hand-held data terminal, the module comprising:
   a housing shell including a scanning window;
   a main circuit board mounted within the housing shell;
   a radio attached to a first side of the main circuit board; and
   a laser scanning assembly attached to a second side of said main circuit board opposite said first side of said main circuit board, laser scanning assembly including a motor assembly having
   a printed circuit board,
   a cylinder formed from a non-magnetic material, said cylinder having a central cavity,
   a plurality of mirrors formed in a peripheral wall of said cylinder,
   a magnetic element disposed in said central cavity, said magnetic member having a plurality of alternately disposed magnetic fields,
   means for connecting said cylinder to said printed circuit board to allow rotation of said cylinder, and
   a plurality of coils disposed on said printed circuit board for forming magnetic fields which cooperate with said magnetic fields of said magnetic element to rotate said cylinder.

5. A data collection and communications module as claimed in claim 4 wherein said main circuit board has a ground plane to isolate said laser scanning assembly from RF signals produced by said radio.

6. A data communications and data collection module as claimed in claim 4 wherein said means for connecting comprises:
   a shaft disposed in said central cavity, a first end of said shaft fixedly engaging said armature;
   a bearing connected to said printed circuit board and engaging a second end of said shaft.

7. A data communications and data collection module as claimed in claim 4 wherein said motor assembly further comprises a magnetically conductive plate disposed on a side of said printed circuit board opposite said plurality of coils, said plate serving as a magnetic flux shunt to return flux to said plurality of coils.

8. A data collection and communications module including means for detachably mounting said module to a hand-held data terminal, the module comprising:
- a housing shell including a scanning window;
- a main circuit board mounted within the housing shell;
- a radio attached to a first side of the main circuit board; and
- a laser scanning assembly attached to a second side of said main circuit board opposite said first side of said main circuit board to allow laser scanning through said scanning window.

9. The data collection and communications module according to claim 8, wherein the laser scanning assembly comprises a support frame, a laser diode mounted to the support frame, a first circuit board mounted to one side of the support frame, the first circuit board comprising a plurality of rotatably driven mirrors, and means for directing a laser beam emitted from the laser diode against said plurality of the rotatably driven mirrors for subjecting the laser beam to a scanning motion, and a second circuit board mounted to a second side of the support frame, the second circuit board including receiving optics for receiving a reflection of the laser beam.

10. The data collection and communications module according to claim 8, wherein the laser scanning assembly comprises a motor, the motor having an armature and a plurality of coils forming a field for rotatably driving the armature, a plurality of mirrors disposed in the peripheral wall of the armature of the motor, and a circuit board, said armature being rotatably mounted to rotate in a plane with respect to said circuit board, and the coils being mounted to the circuit board.

11. The data collection and communications module according to claim 10, wherein the armature comprises a cylinder of non-magnetic material, the mirrors being formed in a peripheral wall of the non-magnetic material, the cylinder having a central cavity, and a magnet having a plurality of alternately disposed field mounted within the cavity, whereby the height of the motor is substantially the combined height of the mirrors and the coils.

* * * * *